United States Patent [19]
Mallard, Jr.

[11] Patent Number: 5,235,617
[45] Date of Patent: Aug. 10, 1993

[54] TRANSMISSION MEDIA DRIVING SYSTEM

[75] Inventor: William C. Mallard, Jr., Nashua, N.H.

[73] Assignee: Digital Equipment Corporation, Maynard, Mass.

[21] Appl. No.: 713,153

[22] Filed: Jun. 11, 1991

[51] Int. Cl.$^5$ ............................................. H04L 25/34
[52] U.S. Cl. .......................................... 375/17; 375/36; 307/270
[58] Field of Search ..................... 375/17, 36; 307/270, 307/473, 253, 254, 255; 330/276, 195

[56] References Cited

U.S. PATENT DOCUMENTS

| | | | |
|---|---|---|---|
| 3,456,206 | 7/1969 | Kwartiroff et al. | 330/32 |
| 3,465,101 | 9/1969 | Christian et al. | 178/68 |
| 3,733,550 | 5/1973 | Tazaki et al. | 325/38 A |
| 3,836,904 | 9/1974 | Cross | 375/36 |
| 3,969,639 | 7/1976 | Granberg et al. | 307/270 |
| 3,980,826 | 9/1976 | Widmer | 178/68 |
| 3,993,953 | 11/1976 | Lender et al. | 325/38 A |
| 4,083,005 | 4/1978 | Looscher | 375/17 |
| 4,101,734 | 7/1978 | Dao | 375/17 |
| 4,271,526 | 6/1981 | Flora | 375/17 |
| 4,437,021 | 3/1984 | Sumi et al. | 375/36 |
| 4,606,046 | 8/1986 | Ludwick | 375/17 |
| 4,627,073 | 12/1986 | Shepperd et al. | 375/20 |
| 4,748,346 | 5/1988 | Emori | 307/270 |
| 4,945,258 | 7/1990 | Picard et al. | 307/270 |
| 5,077,756 | 12/1991 | Christophersen | 375/36 |

OTHER PUBLICATIONS

"A Survey of Coding Schemes for Transmission or Recording of Digital Data" by Kobayashi, IEEE Transactions on Communication Technology, vol. COM-19, No. 6, Dec. 1971, pp. 1087-1100.

"Corrective Data Transmission with Coherent Recovery Using Absolute Reference" by Lender, IEEE Transactions on Communication Technology, vol. COM-16, No. 1, Feb. 1968, pp. 108-115.

"Sequence-State Coding for Digital Transmission" by Franaszek, The Bell System Technical Journal, Nov. 1967, pp. 143-157.

"Digital Communications: Microwave Applications" by Feher, Chapter 7, p. 150.

Primary Examiner—Curtis Kuntz
Assistant Examiner—T. Ghebretinsae
Attorney, Agent, or Firm—A. Sidney Johnston; Barry N. Young

[57] ABSTRACT

A transmission media driving system for receiving high data rate serial binary data signal, dividing the signal into two or more lower data rate signal paths, modified duobinary encoding the signals and transmitting the signals on respective two-conductor transmission lines. The system includes ample encoding circuits for generating control signals and a line driver circuit, associated with each encoding circuit, that is responsive to the control signals to drive one of the transmission lines with the modified duobinary encoded signal through a transformer. The driver circuit includes multiple current sources that are switched to conducting or nonconducting states in response to the control signals to drive currents through a primary winding of the transformer to achieve appropriate levels of the encoded signal.

28 Claims, 7 Drawing Sheets

TRANSMISSION MEDIA DRIVING SYSTEM

BACKGROUND OF THE INVENTION

The present invention is directed in general to a system for transmitting digital information on transmission media and, more particularly, to a balanced differential line driver circuit and method for driving separate conductor pairs in a transmission line or cable with a multi-level digitally encoded line driving signal.

The transmission of digital information over two-conductor balanced transmission cable, such as over twin-axial or flat-line cable or over an unshielded twisted pair telecommunication system cable, is well known. The ability to successfully transmit digital information over such a cable and recover it at a receiving end is dependent on controlling certain aspects of the transmission system. For example, successful data transmission and recovery is dependent on minimizing the introduction of noise and signal distortion into the transmitted data signal. A poorly designed driver can cause noise and distortion of the transmitted data signal and thereby causes errors in the detection of the transmitted data. The most significant form of noise introduced into the transmitted signal is common mode noise.

One source of common mode noise is the unbalanced driving of the two-conductor cable by the line driver apparatus. As used herein, balanced driving of two-conductor cable is ideally achieved when the two conductors of the cable are differentially driven such that the signal potentials on the respective conductors are identical in absolute magnitude, relative to a baseline reference, but of opposite polarity at each point in time. As a result, there is a zero net direct current or unbalanced signal carried by the two conductors during balanced driving of the cable. Correspondingly, unbalanced driving of the two-conductor cable connotes that the two conductors are differentially driven in an unbalanced fashion such that there is a non-zero net signal carried by the two conductors over time. The non-zero net signal represents common mode noise.

A second source of common mode noise is crosstalk between proximate transmission cables. The two-conductor cable discussed above typically represents only one of multiple unshielded insulated pairs of conductors within a single multipair cable. Crosstalk results primarily from capacitive interpair coupling from one conductor pair into another proximate conductor pair. The induced differential signals represent the crosstalk noise. Thus, crosstalk is also a source of transmission interference. A major source of emissions in two-conductor cable is common mode noise since such noise is a non-zero net signal carried by the two-conductor media. Thus, unbalanced driving of the transmission media is also a cause of spurious emissions.

A third source of common mode noise in differentially driven two-conductor cable is the difference in signal edge rates, i.e., rising and falling edge rates, on the respective conductors, since such differences do not mutually cancel. The difference in edge rates can result in common mode noise due to the instantaneous unbalanced driving of the two-conductor cable.

Successful data transmission and recovery also depends on minimizing the return loss of the line driver apparatus. Return loss is caused by a mismatch between the line driver output impedance and the impedance of the transmission cable. Such impedance mismatch results in signal reflections at the interface between the line driver and the transmission cable. The signal reflections cause phase addition and cancellation of the signals being transmitted which results in signal distortion and jitter.

A further parameter upon which successful data transmission and recovery depends is the baseline wander of the transmitted signal. Baseline wander represents the drifting of a reference level, e.g., an average DC voltage level, with respect to which the logic levels of the transmitted signal are defined, and represents another form of common mode noise. Various data encoding schemes such as Manchester encoding and modified duobinary encoding serve to minimize and substantially eliminate baseline wander. As known in the art, such encoding schemes require transmission of a multi-level signal having multiple possible signal levels which are symmetrically centered around a DC voltage level.

Line driver apparatus, as known in the art for driving a pair of conductors, is typically constructed to have a pair of voltage source drivers each with its own internal impedance. As a result, the respective impedances of the drivers of a pair of voltage source drivers may not be identical. A difference between respective impedances of the drivers, over the differential signal swing, results in different rising and falling edge rates of the transmitted signal. As noted above, the difference in edge rates is a sources of common mode noise. A difference between the driver impedances also results in the pair of voltage source drivers driving the pair of cable conductors to different voltage levels for positive and negative signals, which contributes to an unbalanced condition, thus causing baseline wander and common mode noise.

Also, in the case where voltage source drivers are provided as emitter follower circuits, the emitter follower circuits do not drive the conductor pair with a constant source impedance for all possible output signal voltage levels. As a result, a mismatch between source and cable impedances intermittently occurs during transmission and causes the above-noted problem of return loss. Also, emitter follower circuits inherently drive a transmission conductor with faster rising edge rates than falling edge rates. This results in significant differences in signal edge rates across a differentially driven two-conductor cable thus contributing to common mode noise.

The continuing trend with respect to digital information transmission is to increase the effective bandwidth of the transmission media by sending data at a faster data rate. However, there are limitations on the ability to increase the data rate of transmissions over two-conductor transmission cable, especially unshielded two-conductor cable such as used in telecommunication systems. One limitation on increasing the data rate is that spurious emissions increase from unshielded cable as the data rate increases. For example, the increased data rate represents an increased rate at which signal edges occur, so that noise generated by edge rate differences increases with the data rate.

Also, an increased data rate represents an increase in the high frequency spectral content of the transmitted signal. This high frequency spectral content is, in turn, a source of electromagnetic emissions from the transmission media which, as noted above, are a cause of crosstalk and common mode noise. Further, the levels of freely propagating electromagnetic emissions resulting from transmission of digital information are subject to conformance with federal and international standards, for example the standards established by the Federal Communications Commission. Therefore, such standards can impose limits the data rate.

One solution known in the art for reducing emissions associated with high frequency spectral content is the use of an encoding scheme such as the above-noted modified duobinary encoding, which has the effect of reducing the high frequency spectral content of the transmitted signal. However, the emission-reducing effects of such an encoding scheme, which requires driving a two-conductor cable with a multi-level signal, will be significantly impaired if the line driver apparatus cannot drive the cable in a tightly controlled balanced fashion.

Another solution known in the art for reducing emissions associated with high frequency spectral content is the use of shielded cable. However, disadvantageously, such cable is more expensive than unshielded cable and not as readily available as an installed base media to be exploited.

A further solution known in the art for avoiding the problem of emissions associated with high data transmission rates is the optical encoding of the signals and transmission of the optically encoded signals over optical fiber cable. To this end, ANSI standard X3T.9 was developed to standardize parameters of such digital transmission over optical fiber media and defines the fiber data delivery interface (FDDI). The specific characteristics of the FDDI are known to those skilled in the art and are not described herein. However, it is noted that the FDDI dictates a particular encoding scheme for data transmission to minimize baseline wander and a data rate of 125 Mbit/seconds for an NRZI (non-return-to-zero-inverted) coded signal.

One disadvantage of optical encoding is the significant expense associated with apparatus required to translate into optical form the binary data in electrical form on each of a plurality of different data channels.

SUMMARY OF THE INVENTION

The present invention has been made in view of the above circumstances and has as an object to provide a balanced line driver apparatus for driving a two-conductor cable at a high data rate.

It is another object of the present invention to provide balanced line driver apparatus for driving a two-conductor cable with a multi-level encoded signal at a high data rate.

It is a further object of the present invention to provide balanced line driver apparatus for driving a two-conductor cable with minimum common mode noise and return loss.

It is an additional object of the present invention to provide balanced line driver apparatus for driving a two-conductor cable that is not subject to the above described problems and disadvantages resulting from the use of voltage source driver circuits.

It is yet another object of the present invention to provide a data transmission system including balanced line driver apparatus for driving a two-conductor cable with a signal encoded in accordance with FDDI criteria, while also meeting electromagnetic emission standards.

Additional objects and advantages of the invention will be set forth in part in the description which follows and in part will be obvious from the description, or may be learned by practice of the invention. The objects and advantages of the invention may be realized and obtained by means of the instrumentalities and combinations particularly pointed out in the appended claims.

To achieve the objects and in accordance with the purpose of the invention, as embodied and broadly described herein, the present invention is directed to a line driver circuit for providing a balanced three-level line driving signal in a system for driving a transmission medium through a drive transformer, the three-level signal consisting of a positive differential, a baseline and a negative differential signal level. The drive transformer has a primary winding and a secondary winding, the primary winding having first and second terminals for coupling the line driver to the circuit, and the secondary winding for coupling to a pair of conductors in the transmission medium. The line driver circuit is responsive to an externally generated drive control signal that determines a required level of the three-level signal. The line driver circuit comprises a DC supply voltage source, a reference voltage bus, a first electrical load coupled between the voltage source and the reference voltage bus, and a second electrical load coupled between the supply voltage source and the reference voltage bus, the first and second loads being equal in magnitude. The line driver circuit also comprises first current source means, coupled between the first load and the reference voltage bus and responsive to the drive control signal, for conducting a first current magnitude, a second current magnitude or no current, and second current source means, coupled between the second load and the reference voltage bus and responsive to the drive control signal, for conducting the first current magnitude, the second current magnitude or no current. The circuit further includes a first output terminal, between the second load and the second current source means, for coupling to the first terminal of the transformer primary winding, and a second output terminal, between the first load and the first current source means, for coupling to the second terminal of the transformer primary winding. In the line driver circuit, the first and second current source means are responsive to the drive control signal such that the first current source means conducts no current and the second current source means conducts the second current magnitude when the negative differential signal level of the three-level signal is required. The first and second current source means are also responsive to the drive control signal such that the first current source means conducts the second current magnitude and the second current source means conducts no current when the positive differential signal level of the three-level signal is required. The first and second current source means are further responsive to the drive control signal such that each of the first and second current source means conducts the first current magnitude when the baseline level of the three-level signal is required.

Further in accordance with the present invention there is provided a method for providing a balanced three-level line driving signal from a line driver circuit for driving a transmission medium, the three-level signal consisting of a positive differential, a baseline and a negative differential signal level. The line driver circuit drives the transmission medium through a drive transformer having a primary winding and a secondary winding, the primary winding having first and second terminals for coupling to the line driver circuit, the secondary winding for coupling to a pair of conductors in the transmission medium. The line driver circuit includes a DC voltage source, a reference voltage bus, a first electrical load coupled between the voltage source and the reference voltage bus, and a second electrical load coupled between the voltage source and the reference voltage bus, the first and second loads being equal in magnitude. The line driver circuit also includes a first current source between the first load and the reference voltage bus, and a second current source between the second load and the reference voltage bus. The method comprises the steps of conducting a first current magnitude through each of the first and second current sources when the baseline level of the three-level signal is required, conducting no current through the first current source and conducting a second current magnitude through the second current source when the negative differential signal level of the three-level signal is required, and conducting the second current magnitude through the first current source and conducting no current through the second current source when the positive differential signal level of the three-level signal is required.

BRIEF DESCRIPTION OF THE DRAWINGS

The accompanying drawings, which are incorporated in and constitute a part of this specification illustrate embodiments of the invention and, together with the description, serve to explain the objects, advantages, and principles of the invention. In the drawings.

DETAILED DESCRIPTION OF THE PREFERRED EMBODIMENTS

Figure 1:
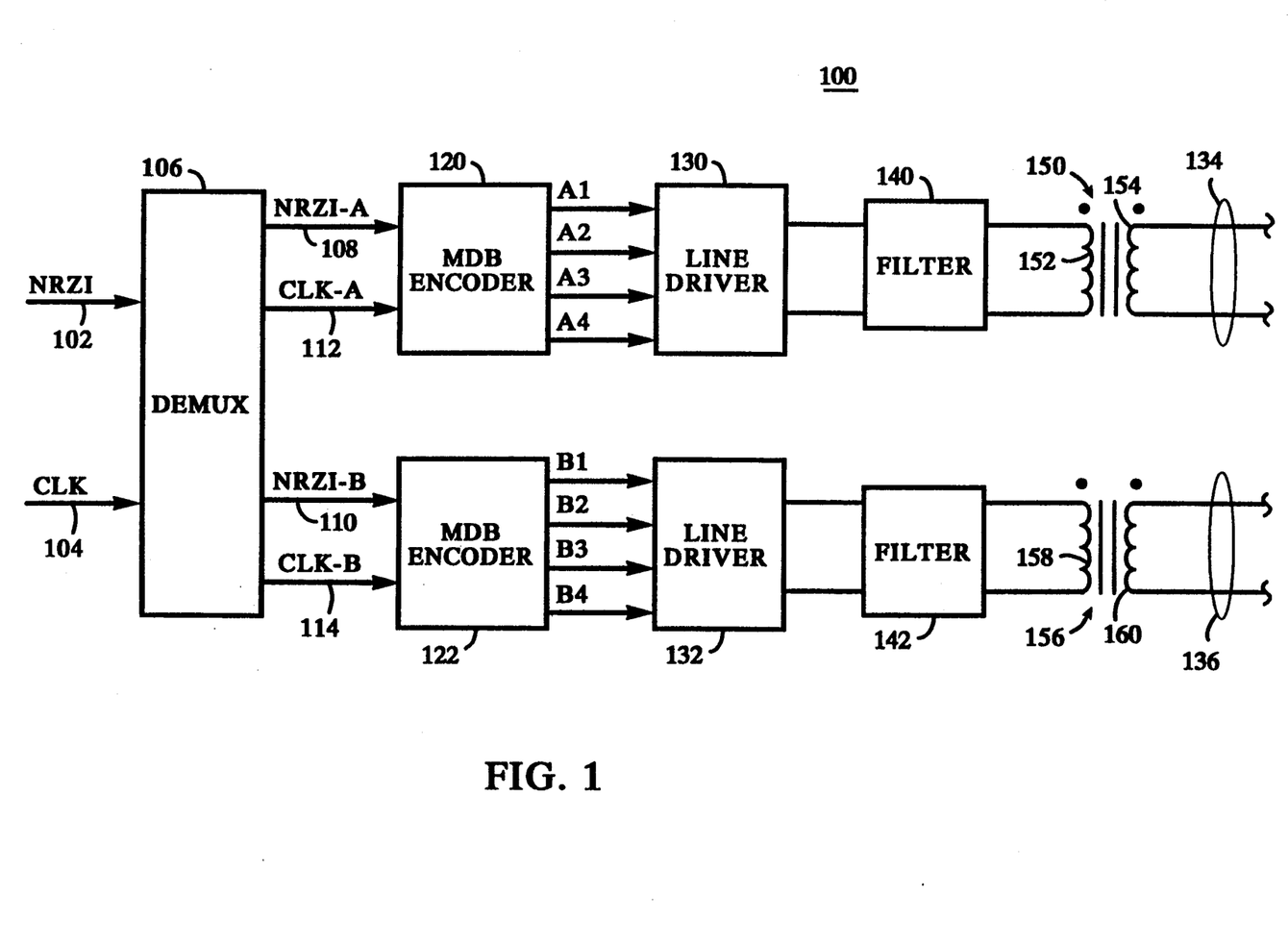
FIG. 1 is a transmission media driving system constructed in accordance with an embodiment of the invention.

Referring now to the drawings, FIG. 1 illustrates a transmission media driving system 100 constructed in accordance with an embodiment of the invention. System 100 is constructed to receive an NRZI encoded serial binary data signal having a high data rate, e.g., 125 Mbit/sec, and an associated clock signal CLK having a frequency corresponding to the data rate, e.g., 125 MHz, and to transmit the received data on separate conductor pairs in one or more transmission lines or cables. In the illustrated embodiment, the NRZI data signal is characterized as being FDDI encoded and having a signal level that it is compatible with emitter-coupled-logic (ECL) circuitry.

The NRZI and CLK signals are respectively received on inputs 102 and 104 of a demultiplexer 106 which divides the NRZI signal into two serial data signals by alternately providing multiple bit segments of the NRZI signal on its outputs 108 and 110. In the illustrated embodiment, such multiple bit segments can range in size from four to seven bits. As a result, demultiplexer 106 provides a 62.5 Mbit/sec serial binary data signal NRZI-A on output 108 and a 62.5 Mbit/sec serial binary data signal NRZI-B on output 110. Demultiplexer 106 further generates two 62.5 MHz clock signals CLK-A and CLK-B, on outputs 112 and 114, that are respectively associated with signals NRZI-A and NRZI-B. In the illustrated embodiment, clock signal CLK-A is synchronized with signal NRZI-A such that each rising and falling edge of the data signal occurs at a falling edge of signal CLK-A. Clock signal CLK-B has the same synchronism with signal NRZI-B.

Demultiplexer 106 is provided in system 100 in order to reduce the data rate to correspondingly reduce the high frequency spectral content of the data being transmitted. Such reduction in frequency spectral content is performed in order to reduce the emissions resulting from transmission of the data signal. The construction of demultiplexers for dividing data streams and providing clock signals synchronized to the data streams is well known in the art and system 100 can be successfully constructed and operated with conventionally constructed demultiplexers. It is preferred herein, however, that demultiplexer 106 be constructed to maintain the voltage levels of the signals NRZI-A and NRZI-B within a signal level range that is compatible with ECL logic. This enables remaining elements of system 100 to be preferably constructed using ECL logic circuitry, as more fully described below.

Still referring to FIG. 1, system 100 also includes modified duobinary (MDB) encoder circuits 120 and 122 that are substantially identical to each other. MDB encoder 120 is connected to receive signals NRZI-A and CLK-A and is constructed to generate four MDB drive control signals A1, A2, A3 and A4. Similarly, MDB encoder 122 is connected to receive signals NRZI-B and CLK-B and is constructed to generate four MDB drive control signals B1, B2, B3 and B4.

System 100 further includes line driver circuits 130 and 132 which are respectively connected to receive the drive control signals generated by MDB encoders 120 and 122. Line driver circuit 130 is constructed to generate line driving signals in response to the drive control signals A1-A4, for driving an associated two-conductor transmission line 134 with a modified duobinary signal corresponding to signal NRZI-A. Thus, MDB encoder 120 is constructed to generate drive control signals A1-A4 adapted to control line driver circuit 130 to appropriately drive transmission line 134.

Similarly, line driver circuit 132 is constructed to generate line driving signals in response to drive control signals B1-B4, for driving an associated two-conductor transmission line 136 with a modified duobinary signal corresponding to signal NRZI-B. Thus, MDB encoder 122 is constructed to generate drive control signals B1-B4 adapted to control line driver circuit 132 to appropriately drive transmission line 136.

The use of modified duobinary encoding of the data signals is used herein in order to drive each transmission line with signals having no DC content, so that the above noted problem of baseline drift is avoided. Further, as described above, the use of modified duobinary encoding reduces the high frequency content of the transmitted signal to correspondingly reduce electromagnetic emissions from transmission lines 134 and 136. Constructions of an MDB encoder and a line driver in accordance with an embodiment of the invention are described below.

Still referring to FIG. 1, system 100 also includes low pass filters 140 and 142 respectively coupled to filter the line driving signals generated by line driver circuits 130 and 132 to control the bandwidth of the frequency spectrum of the transmitted signals.

System 100 additionally includes a line driver transformer 150 having a primary winding 152 connected to filter 140 and a secondary winding 154 connected to transmission line 134. Similarly, system 100 includes a line driver transformer 156 having a primary winding 158 connected to filter 142 and a secondary winding 160 connected to transmission line 136. In the illustrated embodiment, each of transformers 150 and 156 has a 1:1 turns ratio. However, other turns ratios are possible to afford design flexibility in matching the driver output impedance to the line.

Figure 2:
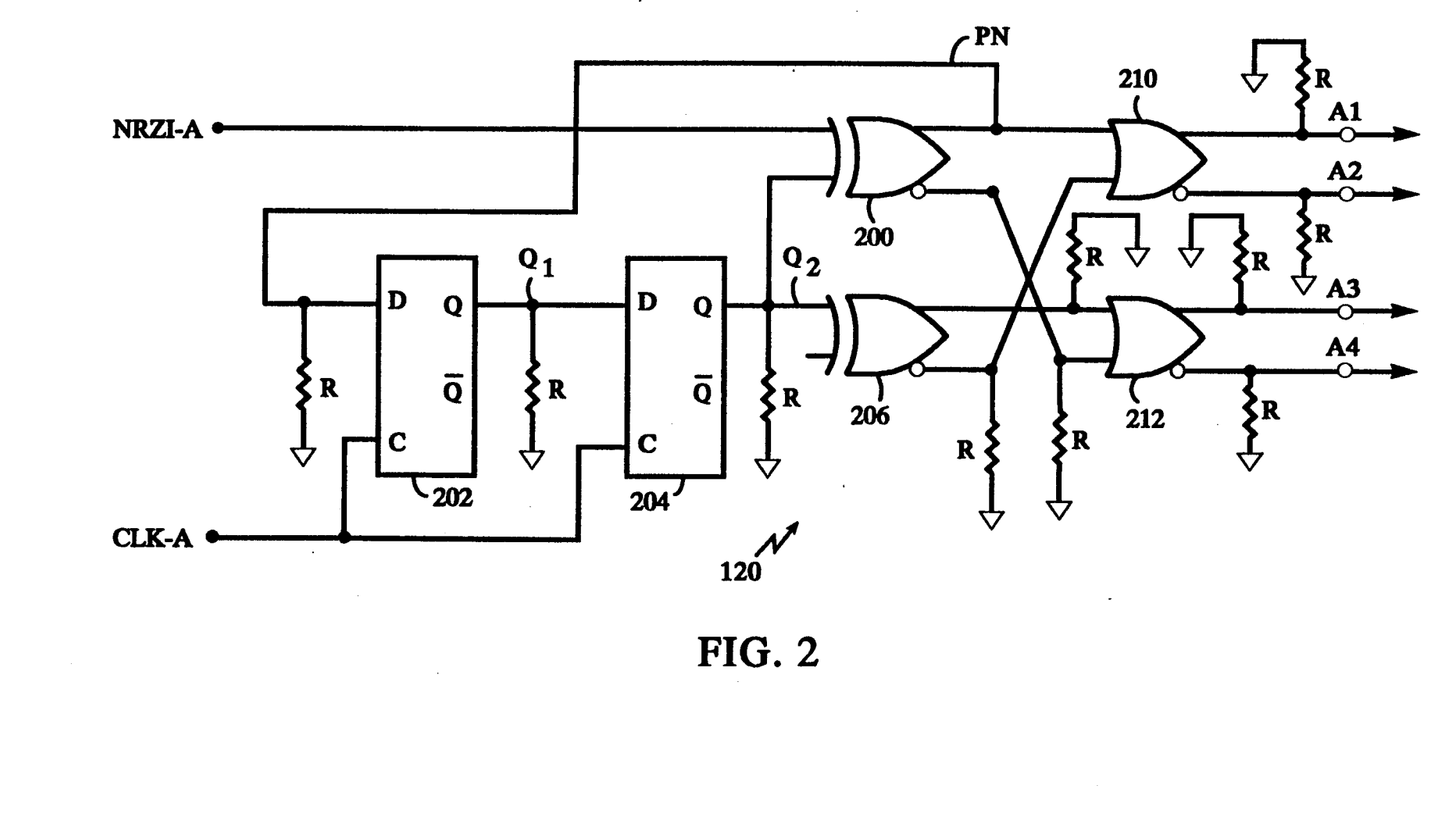
FIG. 2 illustrates an encoder circuit included in the system illustrated in FIG. 1.

FIG. 2 illustrates a preferred construction of MDB encoder 120. As previously noted, MDB encoders 120 and 122 are constructed substantially identically. Generally, the modified duobinary encoding of data signals is known in the art and is described in, for example, U.S. Pat. No. 3,993,953, issued Nov. 23, 1976. However, while encoders 120 and 122 each generally perform such encoding, they are particularly constructed to generate the above-noted drive control signals, which are used to control the line driver circuits to generate a multi-level modified duobinary signal. Referring to FIG. 2, MDB encoder 120 receives data signal NRZI-A on a first input of an exclusive-OR (XOR) gate 200. The noninverted output of XOR gate 200 is connected to a data input D of a flip-flop circuit 202. The clock input of flip-flop circuit 202 is connected to receive the clock signal CLK-A so that the signal provided on data output Q of flip-flop circuit 202 is delayed by one symbol interval of clock signal CLK-A relative to the signal on the noninverted output of XOR gate 200. As defined herein, each rising edge of the clock signal demarks the beginning of a data symbol interval.

Figure 3A:
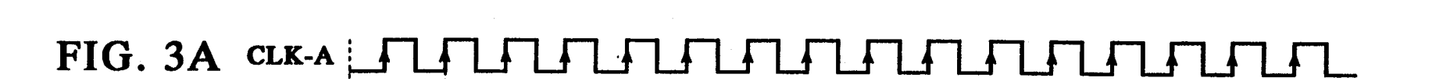
FIGS. 3A-3J are timing diagrams illustrating signals generated during the operation of the system illustrated in FIG. 1.
Figure 3B:
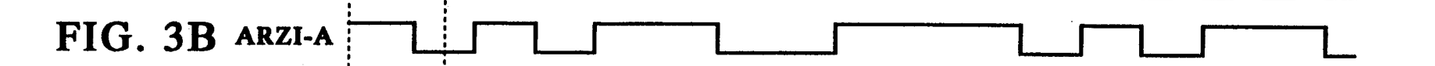
Figure 3C:
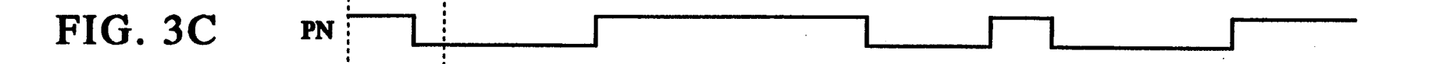
Figure 3D:
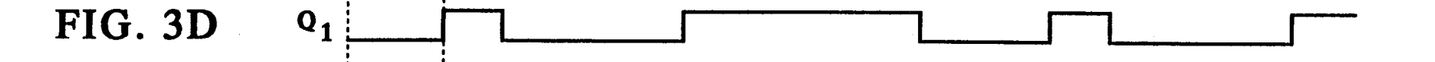

FIGS. 3A-3I are timing diagrams illustrating signals received and generated by MDB encoder 120. In general, the signals illustrated in FIGS. 3A-3I are based on the assumption that prior to time $t_0$, no signals were applied to circuit 120. FIGS. 3A and 3B respectively illustrate clock signal CLK-A and data signal NRZI-A received by encoder 120. The signal provided on the noninverted output of XOR gate 200 is labelled "PN" in FIG. 2 and is illustrated in FIG. 3C. The signal provided on data output Q of the flip-flop circuit 202 is labelled "$Q_1$" in FIG. 2 and is illustrated in FIG. 3D.

Figure 3E:
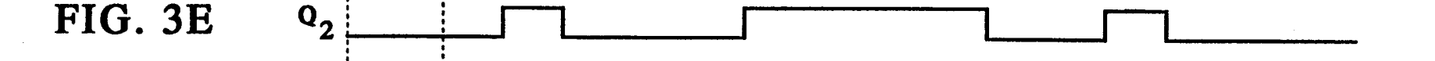

In reference again to FIG. 2, the data input D of a second flip-flop circuit 204 is connected to the data output Q of flip-flop circuit 202. The clock input of flip-flop circuit 204 is connected to receive clock signal CLK-A. As a result, flip-flop circuit 204 provides on its data output Q a signal labelled "$Q_2$" in FIG. 2 and illustrated in FIG. 3E, which is identical to signal "$Q_1$" but is delayed by one symbol interval with respect thereto.

The signal on the data output of flip-flop circuit 204 is applied to a second input of XOR gate 200 to thereby provide the precoding function required for modified duobinary encoding. The data output of flip-flop circuit 204 is also applied to a first input of an XOR gate 206, a second input of which is unconnected. Encoder 120 also includes an OR gate 210 having first and second inputs respectively connected to receive the noninverted output of OR gate 200 and the inverted output of XOR gate 206. Encoder 120 further includes an OR gate 212 having first and second inputs respectively connected to receive the inverted output of XOR gate 200 and the noninverted output of XOR gate 206.

Figure 3F:
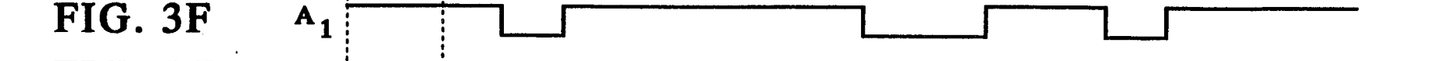
Figure 3G:
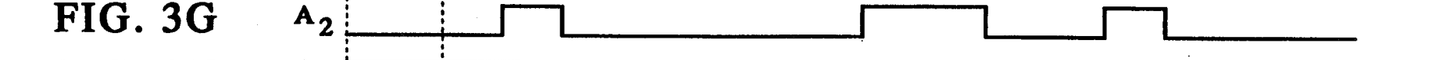
Figure 3H:
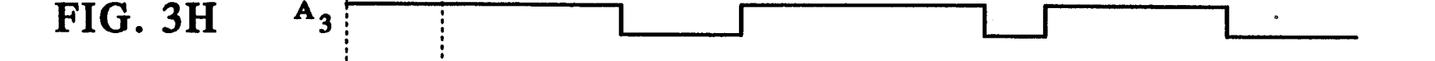
Figures 3I, 3J:
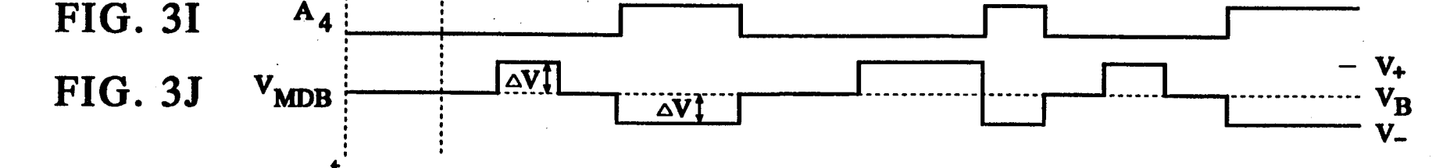

Two-level drive control signals A1 and A2 are respectively provided on the noninverted and inverted outputs of OR gate 210 and are illustrated in FIGS. 3F and 3G. Two-level drive control signals A3 and A4 are respectively provided on the noninverted and inverted outputs of OR gate 212 and are illustrated in FIGS. 3H and 3I.

In accordance with a preferred construction, encoder 120 illustrated in FIG. 2 is constructed using ECL circuitry. As a result and in accordance with a known practice in the art, it is necessary to connect line terminating resistors to the output terminals of the logic devices constructed with ECL circuitry. As shown in FIG. 2, the line terminating resistors are provided as a plurality of resistors "R" each connected between a device output terminal and a reference voltage bus represented by the symbol "∇". In the illustrated embodiment, the reference voltage bus is at ground potential. For example and without limitation, encoder 120 can be constructed using the commercially available circuit components listed in Table 1:

TABLE 1

| Circuit Component | Description |
| --- | --- |
| Flip-flop circuits 202 and 204 | 10H131 |
| XOR gates 200 and 206 | 10H107 |
| OR gates 210 and 212 | 10H105 |
| Resistor R | 510Ω |

For encoder 120 constructed using the components listed in Table 1, signals NRZI-A and CLK-A have signal levels preferably maintained in the raised ECL logic range, e.g., having signal levels of approximately 3.2 volts and 4.2 volts respectively corresponding to 0 and 1 logic levels.

FIG. 3J illustrates the three-level modified duobinary signal $V_{MDB}$ with which line driver circuit 130 drives transmission line 134 in accordance with drive control signals A1-A4, as more fully described below. As seen in FIG. 3J, the signal $V_{MDB}$ consists of a positive differential signal level $V_+$, a baseline signal level $V_B$ and a negative differential signal level $V_-$. It is noted that the high levels of signal A2 and the low levels of signal A3 respectively correspond to the occurrences of the positive and negative signal levels of signal $V_{MDB}$. Also, when signals A2 and A3 are respectively at low and high levels, signal $V_{MDB}$ is at its baseline level. In this manner, signal $V_{MDB}$ is represented by the drive control signals. Signals A1 and A4 are respectively provided as complements to signals A2 and A3 to form the drive control signal pairs A1,A2 and A3,A4 for controlling line driver circuit 130, as described next.

Figure 4A:
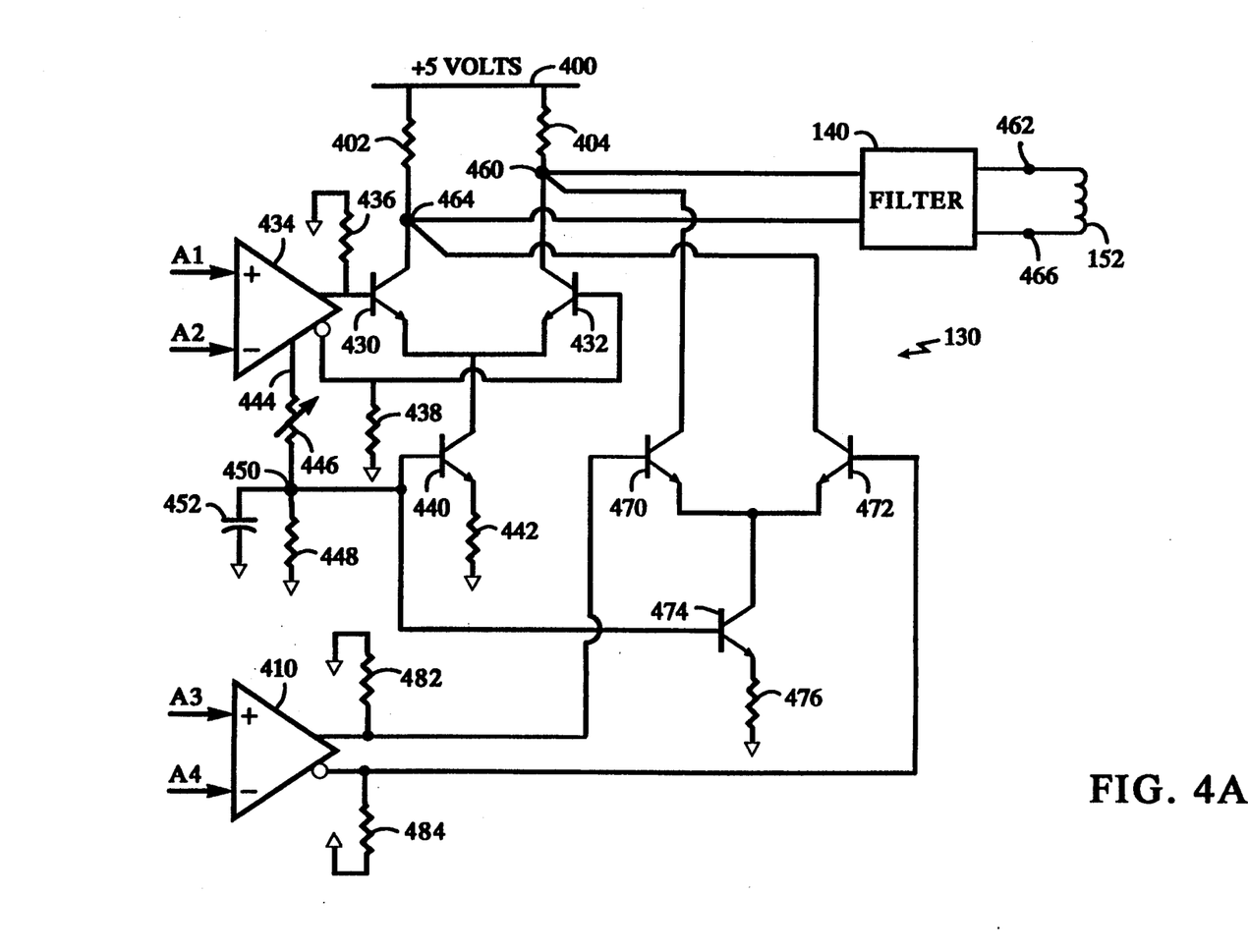
FIGS. 4A and 4B respectively illustrate a line driver circuit and a supply power filter circuit included in the system illustrated in FIG. 1.

FIG. 4A illustrates a preferred construction of line driver circuit 130. Circuit 130 includes a +5 volt DC bus 400 and a pair of substantially identical resistors 402 and 404 connected to source 400. Each resistor 402 and 404 preferably has a resistance value that is one-half the resistive component of the impedance of line 134 as viewed through the primary winding of transformer 150. Each resistor 402 and 404 is further preferably provided such that its resistance value has a tolerance of no more than 1%. Since the resistive component typically dominates the impedance of a two-conductor transmission cable, the selection of the resistances of resistors 402 and 404 to match the resistive component of the impedance of line 134 is effective to minimize the above-described adverse effects of return loss.

Figure 4B:
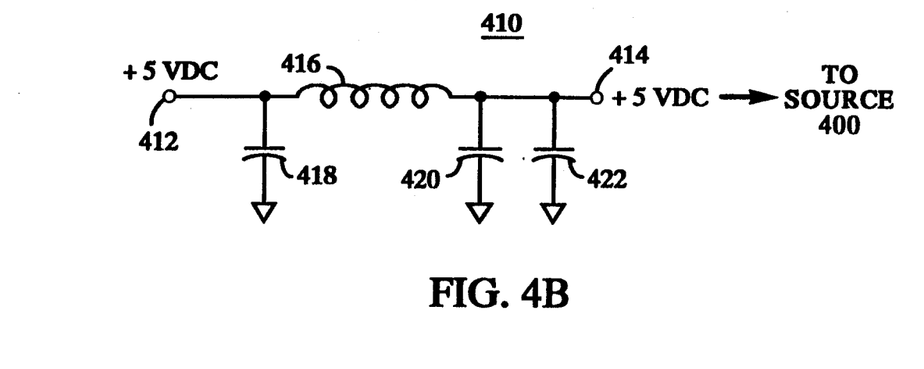

Voltage bus 400 is preferably provided as a filtered voltage source to assure a substantially constant +5 volt value that is substantially free of noise throughout operation. Thus, filter 410 effectively serves as a low pass filter that prevents the entry of common mode noise into line driver circuit 130. FIG. 4B illustrates an exemplary filter 410 for providing the voltage of voltage bus 400. As seen in FIG. 4B, filter 410 has an input terminal 412 connected to receive a locally available +5 volt supply and an output terminal 414 which is connected to voltage bus 400. Thus, filter 410 includes an inductor 416 in series between terminals 412 and 414 and shunt connected capacitors 418, 420 and 422 provided on opposite sides of inductor 416 as shown in FIG. 4B. Capacitors 418, 420 and 422 are each connected to the reference voltage bus for line driver circuit 120 which is represented as the open triangle "∇" and maintained at ground potential in accordance with the preferred construction of circuits 130 and 410. Filter circuit 410 constructed with circuit elements having exemplary values listed below in Table 2 operates as a low pass filter having a frequency cutoff in the kilohertz range.

In reference again to FIG. 4A, line driver circuit 130 also includes substantially identical NPN transistors 430 and 432 having emitter terminals connected together and collector terminals respectively connected to resistors 402 and 404. Circuit 130 also includes a differential amplifier 434 including noninverting and inverting inputs for respectively receiving drive control signals A1 and A2. Differential amplifier 434 includes noninverted and inverted outputs respectively connected to the base terminals of transistors 430 and 432. Differential amplifier 434 is preferably constructed with ECL logic components. Therefore, line terminating resistors 436 and 438 are respectively provided between the noninverted and inverted outputs of differential amplifier 434 and the reference voltage bus.

The common connection of the emitters of transistors 430 and 432 is connected to the collector terminal of an NPN transistor 440. The emitter of transistor 440 is connected to the reference voltage bus through a resistor 442. Since resistor 442 determines, in part, the magnitude of current that flows through each of transistors 430 and 432 and since it is preferred herein to closely regulate the current flowing through each of transistors 430 and 432, resistor 442 is preferably provided with a resistance having a tolerance of no more than 1%.

An ECL logic zero reference output 444 of differential amplifier 434 is connected to the reference voltage bus through an adjustable resistor 446 and a resistor 448. Output 444 provides substantially constant voltage for a wide operating temperature range of line driver circuit 130. Resistors 446 and 448 form a voltage divider circuit having an output voltage tap point 450. A capacitor 452 is connected between tap point 450 and the reference voltage bus to filter any noise that may be present on output 444. Tap point 450 is also connected to the base terminal of transistor 440, so that the voltage at tap point 450 controls the conductivity of transistor 440. Further, since the voltage at tap point 450 is a function of the resistance of resistor 446, the magnitude of current flowing through transistor 440 can be finely adjusted by adjusting resistor 446.

As seen in FIG. 4A, a tap point 460 is provided between resistor 404 and the collector of transistor 432 for connection, through filter 140, to a first terminal 462 of primary winding 152 of transformer 150. A tap point 464 is provided between resistor 402 and the collector of transistor 430 for connection, through filter 140, to a second terminal 466 of primary winding 152.

Line driver circuit 130 additionally includes substantially identical NPN transistors 470 and 472 having collector terminals respectively connected to tap points 460 and 464. Transistors 470 and 472 are substantially identical to transistors 430 and 432. The emitter terminals of transistors 470 and 472 are connected in common and to the collector terminal of an NPN transistor 474. Transistor 474 is substantially identical to transistor 440. The emitter terminal of transistor 474 is connected to the reference voltage bus through a resistor 476. Resistor 476 is substantially identical to resistor 442. Since resistor 476, in conjunction with the voltage applied to the base of transistor 474, determines the magnitude of current that flows through each of transistors 470 and 472, and since it is preferred herein to closely regulate the current flowing through each of transistors 470 and 472, resistor 476 is preferably provided with a resistance having a tolerance of no more than 1%.

The base terminal of transistor 474 is connected to tap point 450 so that the conductivity of transistor 474 is controlled by the voltage at tap point 450 and is therefore substantially identical to that of transistor of 440. Temperature compensation of circuit 130 is achieved by controlling the conductivities of both transistors 440 and 474 with the voltage at tap point 450. Thus, as the temperature of circuit 130 varies, the voltages at reference output 444 and tap point 450 vary complementarily with respect to the conductivities of transistors 440 and 474 in order to regulate the currents flowing through transistors 430, 432, 470 and 472 to be essentially constant. That is, since the voltage at reference output 444 decreases with temperature, it compensates for the effect of temperature on the base-to-emitter voltage drop of each of transistors 440 and 474.

Line driver circuit 130 also includes differential amplifier 480 which is substantially identical to differential amplifier 434 and which is therefore preferably constructed of ECL logic circuitry. Differential amplifier 480 has noninverting and inverting inputs for receiving drive control signals A3 and A4 and has noninverted and inverted outputs connected to the base terminals of transistors 470 and 472, respectively. Resistors 482 and 484 are respectively connected between the noninverted and inverted outputs of differential amplifier 480 and the reference voltage bus to serve as line terminating resistors.

Figure 5:
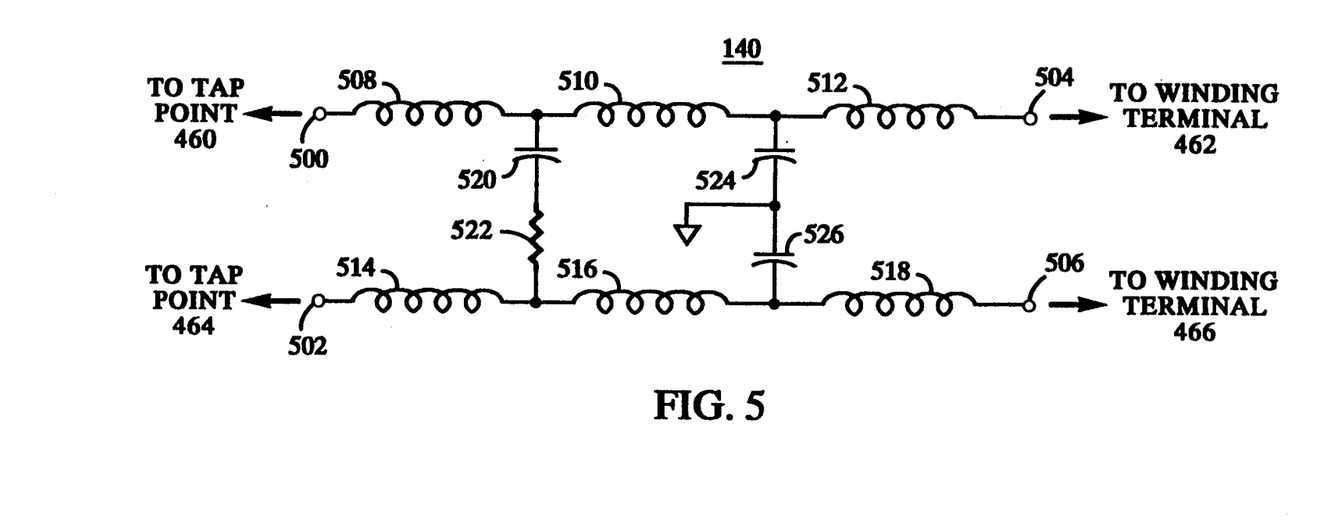
FIG. 5 illustrates another filter circuit included in the system illustrated in FIG. 1.

Filter 140 is preferably provided as a Butterworth type filter, known in the art, and is configured to have five poles. FIG. 5 illustrates a preferred construction of filter 140. Referring to FIG. 5, filter 140 includes input terminals 500 and 502 and output terminals 504 and 506. Inductors 508, 510 and 512 are connected in series between input terminal 500 and output terminal 504. Inductors 514, 516 and 518 are connected in series between input terminal 502 and output terminal 506. A capacitor 520 is connected in series with a resistor 522 and the series combination of capacitor 520 and resistor 522 is connected at one end between inductor 508 and 510, and at the other end between inductors 514 and 516. Capacitors 524 and 526 are connected in series with a point there between connected to the reference voltage bus, which is at ground potential in the preferred embodiment. The series combination of capacitors 524 and 526 is connected at one end between inductors 510 and 512, and at the other end between inductors 516 and 518.

For example and without limitation, line driver circuit 130 and filters 140 and 410 can be constructed using the commercially available circuit components listed in Table 2:

TABLE 2

| Circuit Component | Description |
|---|---|
| Differential Amplifiers 434 and 480 | 10H116 |
| Transistors 430 and 432 | CA3146 |
| Transistors 470 and 472 | CA3146 |
| Transistors 440 and 476 | 2N2222 |
| Resistors 402 and 404 | 50Ω (1% tolerance) |
| Resistors 442 and 476 | 82.5Ω (1% tolerance) |
| Resistor 446 | 5KΩ (adjustable) |
| Resistor 448 | 1.5KΩ (5% tolerance) |
| Resistors 436, 438, 482 and 484 | 470Ω |
| Resistor 522 | 15Ω (1% tolerance) |
| Capacitors 418, 420 and 452 | 0.1 μF |
| Capacitor 422 | 10 μF |
| Capacitor 520 | 68 pF |
| Capacitors 524 and 526 | 82 pF |
| Inductor 416 | 0.22 μH |
| Inductors 508 and 514 | 0.307 μH |
| Inductors 510 and 516 | 0.314 μH |
| Inductors 512 and 518 | 0.06 μH |
| Transformer 150 | 1:1 ratio |

The operation of driving system 100 is described next. The NRZI signal received by driving system 100 on input 102 of multiplexer 106 is divided by the multiplexer into serial data signals NRZI-A and NRZI-B and respectively accompanying clock signals CLK-A and CLK-B, signals NRZI-A and CLK-A respectively being illustrated in FIGS. 3B and 3A. MDB encoder 120 encodes the received NRZI-A signal in accordance with the requirements of modified duobinary encoding. As a result, MDB encoder 120 provides drive control signals A1-A4 (FIGS. 3F-3I) for controlling the operation of line driver circuit 130.

MDB encoder 122 operates in a manner substantially identically to that described above for MDB encoder 120, and encodes the received NRZI-B signal in accordance with modified duobinary encoding requirements to provide drive control signals B1-B4.

The operation of line driver circuit 130 is described next with reference to FIGS. 3F-3J, 6A, 6B and 6C. Since driver circuits 130 and 132 are substantially identical, it is understood that the operating description for circuit 130 also applies to circuit 132. FIG. 3J illustrates the waveform of signal $V_{MDB}$ with which transmission line 134 is driven, having any one of the positive differential signal voltage level $V_+$, the baseline signal voltage level $V_B$ and the negative differential signal voltage level $V_-$. The voltage levels $V_+$ and $V_-$ are respectively greater and less than the voltage level $V_B$ by the same fixed predetermined voltage difference $\Delta V$. In the preferred embodiment, with the voltage at bus 400 selected to be +5 volts, voltage level $V_B$ is approximately 2.5 volts and $\Delta V$ is no greater than 1.25 volts.

Figure 6A:
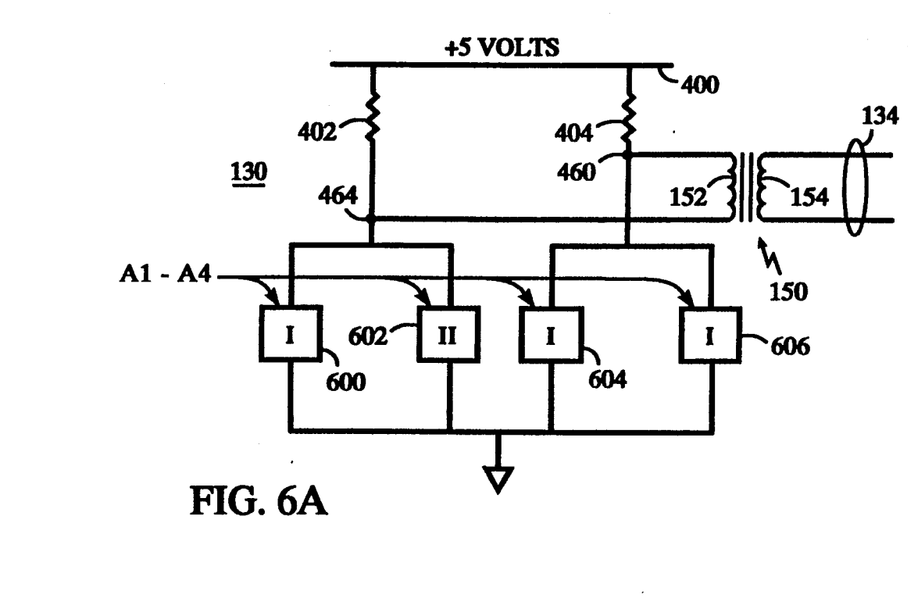
FIGS. 6A-6D are simplified diagrams of the line driver circuit illustrated in FIG. 4A for explaining the operation of the line driver circuit.

FIG. 6A illustrates a simplified diagram of the construction of line driver circuit 130 that is used below in connection with explaining the operation of circuit 130 for generating signal $V_{MDB}$ to drive transmission line 134 with the MDB signal levels $V_B$, $V_+$ and $V_-$.

In FIG. 6A, line driver circuit 130 is illustrated as including four current sources 600, 602, 604 and 606 that respectively correspond to conductive paths through transistors 430, 472, 432 and 470 in FIG. 4A. As also diagrammatically represented in FIG. 6A, the four current sources are responsive to drive control signals A1–A4 which determine their conductive states. In FIG. 4A, line driver circuit 130 has been constructed so that when each transistor 430, 432, 470 and 472 is switched to the conductive state, it conducts the same magnitude of current which, for the purpose of explanation, is referred to herein as "I". This result is achieved by selecting certain components of driver circuit 130 to be identical so that the same type components determine the magnitude of current flowing through any one of transistors 430, 432, 470 and 472. Also, the respective bases of transistors 440 and 474 are connected to the same node point 450 so that variations in operating temperature that cause the voltages at reference output 444 and node point 450 to vary cause the same change in the operating characteristic of each of transistors 440 and 474. Also, any adjustment of resistor 446 is manifested at node point 450 and therefore has the same effect on the operating characteristics of both transistors 440 and 474.

As a result of the connection of the complementary outputs of differential amplifiers 434 and the complementary outputs of differential amplifier 480, only one of transistors 430 and 432 is conductive at any one time, and only one of transistors 470 and 472 is conductive at any one time. Therefore, referring to FIG. 6A, only one of current sources 600 or 604 is conductive at any one time, and only one of current sources 602 or 606 is conductive at any one time. For example, if signals A1 and A2 have respectively high and low logic levels, the noninverted and inverted outputs of differential amplifier 434 are respectively at relative high and low logic potential levels. As a result, transistor 430 is rendered conducting and transistor 432 is rendered nonconducting. The respective conductive states of current sources 600-606 as a function of the drive control signal logic levels and corresponding signal voltage level of the modified duobinary signal are summarized below in Table 3. In Table 3, the logic levels of drive control signals A1-A4 are characterized as a 0 or 1 logic level respectively corresponding to a relative low or high signal potential.

TABLE 3

| State | | | | | Current Source ON/OFF | | | |
|---|---|---|---|---|---|---|---|---|
| MDB | A1 | A2 | A3 | A4 | 600 | 602 | 604 | 606 |
| $V_-$ | 1 | 0 | 0 | 1 | OFF | OFF | ON | ON |
| $V_B$ | 1 | 0 | 1 | 0 | ON | OFF | ON | OFF |
| $V_+$ | 0 | 1 | 1 | 0 | ON | ON | OFF | OFF |

Figure 6B:
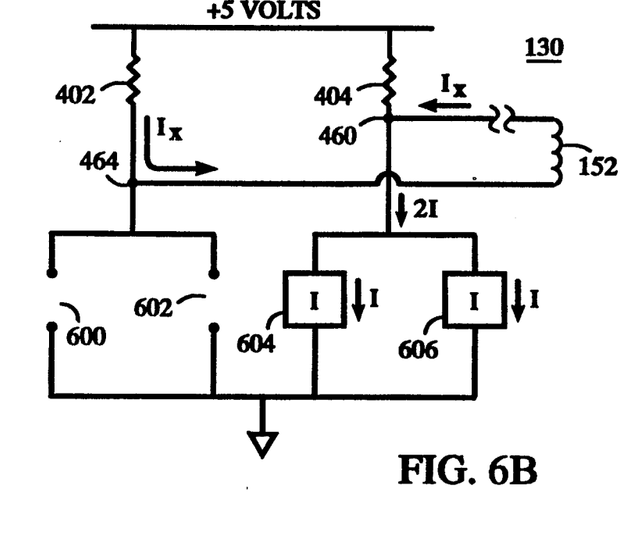

FIG. 6B diagrammatically illustrates the currents flowing in line driver circuit 130 and through transformer primary winding 152 during the condition when drive control signals A1-A4 correspond to the modified duobinary signal level $V_-$. As seen in FIG. 6B for this state of signals A1-A4, current sources 600 and 602, respectively corresponding to transistors 430 and 472, are nonconducting, while current sources 604 and 606, respectively corresponding to transistors 432 and 470, each conduct current I. Because of the different currents flowing through resistors 402 and 404 and because of the conductive path through primary winding 152 of transformer 150, a current $I_x$ flows through resistor 402 and primary winding 152 in a direction that induces a negative polarity voltage in secondary winding 154 corresponding to signal voltage $V_-$. This result is based on the transformer winding polarities indicated by the dot markings in FIG. 1. The magnitude of current $I_x$ is determined by the rules of current division as shown in equation (1):

$$I_x = 2I \times \frac{R_{404}}{R_{402} + R_{404} + R_{Load}} \quad (1)$$

where $R_{402}$ and $R_{404}$ are the respective resistances of resistors 402 and 404, and $R_{Load}$ is the resistive portion of the line impedance of line 134 as viewed through transformer 150. Since as described above, both $R_{402}$ and $R_{404}$ are one-half $R_{LOAD}$, the magnitude of $I_x$ is approximately I/2.

Figure 6C:
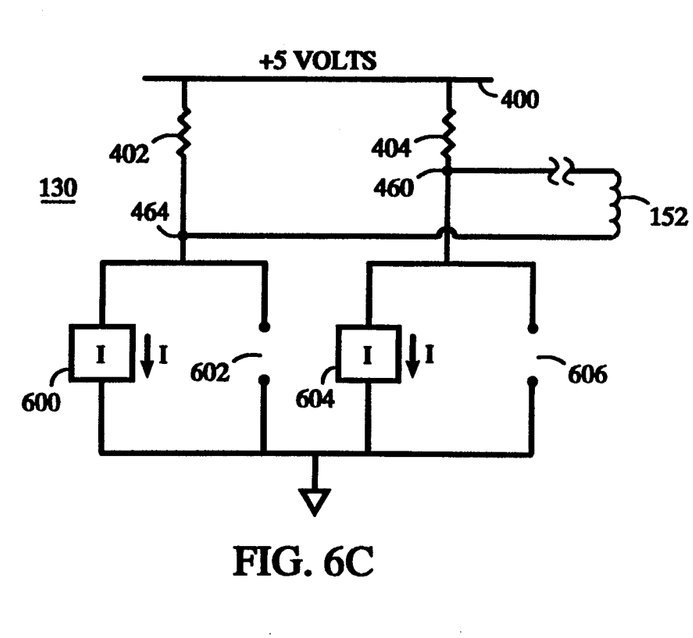

FIG. 6C diagrammatically illustrates the currents flowing in the driver circuit 130 during the condition when drive control signals A1-A4 correspond to the modified duobinary signal level $V_B$. As seen in FIG. 6C, for this state of signals A1-A4, current sources 602 and 606 are nonconducting, and current sources 600 and 604 each conduct current I. Since the currents flowing through resistors 402 and 404 are equal, there is no net current flowing through primary winding 152.

Figure 6D:
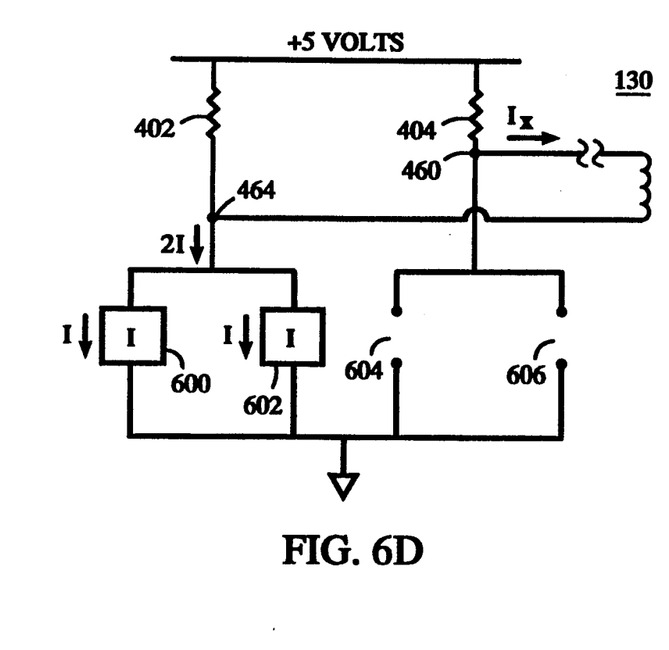

FIG. 6D diagrammatically illustrates the currents flowing in line driver circuit 130 during the condition when drive control signals A1-A4 correspond to the modified duobinary signal level $V_+$. As seen in FIG. 6D, for this state of signals A1-A4, current sources 600 and 602 each conduct current I, and current sources 604 and 606 are nonconductive. Because of the different currents flowing through resistors 402 and 404 and because of the conductive path through primary winding 152, the current $I_x$ flows through resistor 404 and primary winding 152 in a direction that induces a positive polarity voltage in secondary winding 154 corresponding to signal level $V_+$. The magnitude of current $I_x$ is as noted above in equation (1), since resistors 402 and 404 are the same.

Since line driver circuit 130 causes the current $I_x$ to flow in one or the other direction through primary winding 152 to drive signals $V_+$ or $V_-$ on transmission line 134, those voltage values are assured to differ from voltage $V_B$ by the same voltage difference $\Delta V$ (FIG. 3J) which is set by the magnitude of current $I_x$. This achieves balanced driving of line 134 without generation of common mode noise or baseline wander.

Also in accordance with the operation of line driver circuit 130, since the flow of current $I_x$ through primary winding 152 determines the signal voltage level $V_+$ or $V_-$ and the terminals of primary winding 152 are not separately driven, such as with a pair of voltage source drivers, the driving of transmission line 134 by line driver circuit 130 is balanced and there is no difference in signal edge rates. Further, for each configuration of current sources 600-606, the impedance of line driver circuit 130 is primarily determined by resistors 402 and 404, so that by properly selecting these resistors as a function of the transmission line resistance, as described above, the resistance of line driver circuit 130 matches the resistive portion of the characteristic impedance of transmission line 134 and the adverse effects of return loss are minimized.

While a driving system 100 has been illustrated and described herein for driving two-conductor transmission lines with a multi-level encoded signal having three signal levels, the invention is not so limited. The line driver circuit of the invention can readily be adapted to drive two-conductor transmission lines with balanced multi-level signals consisting of n signal levels, where n is an odd integer, one of the signal levels is a baseline level, and the remaining signal levels are uniformly distributed above and below the baseline level. In such a case, each line driver circuit of the line driver system would include two resistors corresponding to resistors 402 and 404, with m/2 substantially identical current sources coupled between each of the two resistors and the reference voltage bus, where m=n+1 and a current source is defined as set forth above.

For example, in the case of n=5 for which three current sources are coupled between each resistor and the reference voltage bus, the transmission line is driven with the baseline level of the multi-level signal by rendering conductive one current source in series with each of the two resistors. First and second successively more positive (or negative) differential signal levels would be achieved respectively by rendering conductive two and three current sources in series with one resistor while the current sources in series with the other resistor are rendered nonconductive.

The present inventor notes that for n>7, it is preferred to render conductive two current sources in series with each resistor to achieve the baseline signal level. Also for n>7, to achieve a first, second, etc., successively more positive (negative) signal levels, two, three, etc. current sources would be rendered conductive in series with one resistor while the current sources in series with the other resistor are rendered nonconductive.

While an embodiment of the invention has been illustrated and described for practice using raised ECL logic levels, the invention can be constructed and successfully practiced using normal ECL logic levels, e.g., having signal levels of approximately −0.8 volts and −1.2 volts respectively corresponding to 1 and 0 logic levels.

Also, while an embodiment of the invention has been illustrated and described as constructed with ECL logic circuitry, the invention can be successfully constructed and practiced using other types of circuitry such as constructed with discrete devices or fully integrated circuitry. Further, while modified duobinary encoding is used in the illustrated embodiment, the invention can be successfully practiced with other balanced encoding schemes known in the art for minimizing baseline wander and possibly reducing the high frequency portion of the spectral content of the transmitted signal.

While a transmission media driving system has been illustrated and described as including circuitry for modified duobinary encoding of a data signal for transmission, the invention is not so limited. The invention can be successfully practiced with other encoding methods known in the art, such as Manchester encoding and bipolar encoding, which provide a balanced signal having a substantially zero DC content.

The foregoing description of the preferred embodiments and examples of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the are to utilize the invention in various embodiments and with various modifications as are suited to the particular use contemplated. It is intended that the scope of the invention be defined by the claims appended hereto, and their equivalents.

What is claimed is:

1. A line driver circuit for providing a balanced three-level line driving signal in a system for driving a transmission medium through a drive transformer, the three-level signal consisting of a positive, a baseline and a negative differential signal level, the drive transformer having a primary winding and a secondary winding, the primary winding having first and second terminals for coupling to said line driver circuit, the secondary winding for coupling to a pair of conductors in the transmission medium, said line driver circuit responsive to an externally generated drive control signal that determines a required level of the three-level signal, said line driver circuit comprising:
   a DC voltage source;
   a reference voltage bus;
   a first electrical load coupled between said voltage source and said reference voltage bus;
   a second electrical load coupled between said voltage source and said reference voltage bus, said first and second loads being equal in magnitude;
   first current source means, coupled between said first load and the reference voltage bus and responsive to the drive control signal, for conducting a first current magnitude, a second current magnitude or no current;
   second current source means, coupled between said second load and the reference voltage bus and responsive to the drive control signal, for conducting the first current magnitude, the second current magnitude or no current;
   a first output terminal, between said second load and said second current source means, for coupling to the first terminal of the transformer primary winding;
   a second output terminal, between said first load and said first current source means, for coupling to the second terminal of the transformer primary winding;
   said first and second current source means responsive to the drive control signal such that said first current source means conducts no current and said second current source means conducts the second current magnitude when the negative differential signal level of the three-level signal is required;
   said first and second current source means responsive to the drive control signal such that said first current source means conducts the second current magnitude and said second current source means conducts no current when the positive differential signal level of the three-level signal is required; and
   said first and second current source means responsive to the drive control signal such that each of said first and second current source means conducts the first current magnitude when the baseline level of the three-level signal is required.

2. The line driver circuit of claim 1 wherein each of said first and second loads is a resistance; and the sum of the resistances of said first and second loads is substantially equal to a resistive portion of the characteristic impedance of the conductor pair.

3. The line driver circuit of claim 2 wherein the resistance of each of said first and second loads has a tolerance of no more than 1%.

4. The line driver circuit of claim 1 further including control means, coupled to receive said drive control signal, for providing switching control signals to said first and second current source means to control the conducting state of each of said first and second current source means.

5. The line driver circuit of claim 4 wherein
   the second current magnitude is twice the first current magnitude;
   said first current source means includes first and second bipolar transistors (BPT) each having a collector terminal coupled to said first output terminal, and
   said second current source means includes third and fourth BPTs each having a collector terminal coupled to said second output terminal;
   said line driver circuit further including:
   a fifth BPT having a collector terminal connected in common with emitter terminals of said first and third BPTs, an emitter terminal of said fifth BPT being coupled to the reference voltage bus;
   a sixth BPT having a collector terminal connected in common with emitter terminals of said second and fourth BPTs, an emitter terminal of said sixth BPT being coupled to the reference voltage bus;
   base terminals of said fifth and sixth BPTs being coupled in common to receive a predetermined voltage; and
   base terminals of said first, second, third and fourth BPTs being coupled to receive said switching signals.

6. The line driver of claim 5 further including:
   a first resistor coupled between the emitter terminal of said fifth BPT and the reference voltage bus;
   a second resistor coupled between the emitter terminal of said sixth BPT and the reference voltage bus; and
   the respective resistances of said first and second resistors being equal to each other and each having a tolerance of no more than 1%.

7. The line driver circuit of claim 6 wherein said drive control signal consists of first, second, third and fourth drive control signals, said first and second drive control signals being complementary and said third and fourth drive control signals being complementary, said control means including:
   a first differential amplifier having noninverting and inverting inputs for respectively receiving said first and second drive control signals, said first differential amplifier having noninverted and inverted outputs respectively coupled to the base terminals of said first and third BPTs; and
   a second differential amplifier having noninverting and inverting inputs for respectively receiving said third and fourth drive control signals, said second differential amplifier having noninverted and inverted outputs respectively coupled to the base terminals of said second and fourth BPTs.

8. The line driver circuit of claim 7 wherein
   said first differential amplifier comprises emitter coupled logic circuitry and includes a logic zero voltage reference terminal;
   a third resistor coupled to the logic zero voltage reference terminal;
   a fourth resistor coupled between the first resistor and the reference voltage bus;
   a capacitor coupled at one end to a junction point between said third and fourth resistors and at its other end to the reference voltage bus; and said base terminals of said fifth and sixth BPTs being coupled to the junction point to receive the predetermined voltage.

9. The line driver circuit of claim 8 wherein the third resistor is an adjustable resistor such that the predetermined current magnitude can be increased or decreased by adjusting said third resistor to respectively decrease or increase its resistance.

10. A line driver circuit for providing a balanced three-level line driving signal in a system for driving a transmission medium through at least a first drive transformer, the three-level signal consisting of a positive differential, a baseline and a negative differential signal level, the drive transformer having a primary winding and a secondary winding, the primary winding having first and second terminals for coupling to said line driver circuit, the secondary winding for coupling to a pair of conductors in the transmission medium, said line driver circuit responsive to an externally generated drive control signal that determines a required level of the three-level signal, said line driver circuit comprising:

a DC voltage source;

a reference voltage bus;

a first electrical load coupled between said voltage source and said reference voltage bus;

a second electrical load coupled between said voltage source and said reference voltage bus, said first and second loads being equal in magnitude;

first current source means, coupled between said first load and said reference voltage bus and responsive to the drive control signal, for conducting or not conducting a predetermined current magnitude in accordance with the drive control signal;

second current source means, coupled between said first load and said reference voltage bus and responsive to the drive control signal, for conducting or not conducting the predetermined current magnitude in accordance with the drive control signal;

third current source means, coupled between said second load and said reference voltage bus and responsive to the drive control signal, for conducting or not conducting the predetermined current magnitude in accordance with the drive control signal;

fourth current source means, coupled between said second load and said reference voltage bus and responsive to the drive control signal, for conducting or not conducting the predetermined current magnitude in accordance with the drive control signal;

a first output terminal, between said second load and said third current source means, for coupling to the first terminal of the transformer primary winding;

a second output terminal, between said first load and said first current source means, for coupling to the second terminal of the transformer primary winding;

said first, second, third and fourth current source means responsive to the drive control signal such that said first and second current source means are conducting and said third and fourth current source means are nonconducting when the negative differential signal level of the three-level signal is required;

said first, second, third and fourth current source means responsive to the drive control signal such that said first and second current source means are nonconducting and said third and fourth current source means are conducting when the positive differential signal level of the three-level signal is required; and said first, second, third and fourth current source means responsive to the drive control signal such that said second and fourth current source means are nonconducting and said first and third current source means are conducting when the baseline level of the three-level signal is required.

11. The line driver circuit of claim 10 wherein each of said first and second loads is a resistance; and the sum of the resistances of said first and second loads is substantially equal to a resistive portion of the characteristic impedance of the conductor pair.

12. The line driver circuit of claim 11 wherein the resistance of each of said first and second loads has a tolerance of no more than 1%.

13. The line driver circuit of claim 10 further including control means, coupled to receive said drive control signal, for providing switching control signals to said first, second, third and fourth current source means to control the conducting state of each of said first, second, third and fourth current source means.

14. The line driver circuit of claim 13 wherein said first current source means includes a first bipolar transistor (BPT) having a collector terminal coupled to said first output terminal, said second current source means includes a second BPT having a collector terminal coupled to said first output terminal, said third current source means includes a third BPT having a collector terminal coupled to said second output terminal, and said fourth current source means includes a fourth BPT having a collector terminal coupled to said second output terminal;

said line driver circuit further including:

a fifth BPT having a collector terminal connected in common with emitter terminals of said first and third BPTs, an emitter terminal of said fifth BPT being coupled to the reference voltage bus;

a sixth BPT having a collector terminal connected in common with emitter terminals of said second and fourth BPTs, an emitter terminal of said sixth BPT being coupled to the reference voltage bus;

base terminals of said fifth and sixth BPTs being coupled in common to receive a predetermined voltage; and base terminals of said first, second, third and fourth BPTs being coupled to receive said switching signals.

15. The line driver of claim 14 further including:

a first resistor coupled between the emitter terminal of said fifth BPT and the reference voltage bus;

a second resistor coupled between the emitter terminal of said sixth BPT and the reference voltage bus; and the respective resistances of said first and second resistors being equal to each other and each having a tolerance of no more than 1%.

16. The line driver circuit of claim 14 wherein said drive control signal consists of first, second, third and fourth drive control signals, said first and second drive control signals being complementary and said third and fourth drive signals being complementary, said control means including:

a first differential amplifier having noninverting and inverting inputs for respectively receiving said first and second drive control signals, said first differential amplifier having noninverted and inverted outputs respectively coupled to the base terminals of said first and third BPTs; and a second differential amplifier having noninverting and inverting inputs for respectively receiving said third and fourth drive control signals, said second differential amplifier having noninverted and inverted outputs respectively coupled to the base terminals of said second and fourth BPTs.

17. The line driver circuit of claim 7 wherein said first differential amplifier comprises emitter coupled logic circuitry and includes a logic zero voltage reference terminal;

a third resistor coupled to the logic zero voltage reference terminal;

a fourth resistor coupled between the first resistor and the reference voltage bus;

a capacitor coupled at one end to a junction point between said third and fourth resistors and at its other end to the reference voltage bus; and said base terminals of said fifth and sixth BPTs being coupled to the junction point to receive the predetermined voltage.

18. The line driver circuit of claim 17 wherein the third resistor is an adjustable resistor such that the predetermined current magnitude can be increased or decreased by adjusting said third resistor to respectively decrease or increase its resistance.

19. The line driver circuit of claim 10 for providing a second balanced three-level line driving signal for driving a second pair of conductors of the transmission medium through a second drive transformer, the second drive transformer having a primary winding and a secondary winding, the primary winding having first and second terminals for coupling to said line driver circuit, the secondary winding for coupling to the second pair of conductors, said line driver circuit responsive to an externally generated second drive control signal that determines the required level of the second three-level signal, said line driver circuit further comprising:

means for driving the second transformer with the second three-level signal.

20. The line driver circuit of claim 19, said means for driving the second transformer including:

a third electrical load coupled between said voltage source and said reference voltage bus;

a fourth electrical load coupled between said voltage source and said reference voltage bus, said third and fourth loads being equal in magnitude;

fifth current source means, coupled between said third load and said reference voltage bus and responsive to the second drive control signal, for conducting or not conducting a second predetermined current magnitude in accordance with the second drive control signal;

sixth current source means, coupled between said third load and said reference voltage bus and responsive to the second drive control signal, for conducting or not conducting the second predetermined current magnitude in accordance with the second drive control signal;

seventh current source means, coupled between said fourth load and said reference voltage bus and responsive to the second drive control signal, for conducting or not conducting the second predetermined current magnitude in accordance with the second drive control signal;

eighth current source means, coupled between said fourth load and said reference voltage bus and responsive to the second drive control signal, for conducting or not conducting the second predetermined current magnitude in accordance with the second drive control signal;

a third output terminal, between said fourth load and said seventh current source means, for coupling to the first terminal of the second transformer primary winding;

a fourth output terminal, between said third load and said fifth current source means, for coupling to the second terminal of the second transformer primary winding;

said fifth, sixth, seventh and eighth current source means responsive to the second drive control signal such that said fifth and sixth current source means are conducting and said seventh and eighth current source means are nonconducting when the negative differential signal level of the second three-level signal is required;

said fifth, sixth, seventh and eighth current source means responsive to the second drive control signal such that said fifth and sixth current source means are nonconducting and said seventh and eighth current source means are conducting when the positive differential signal level of the second three-level signal is required; and said fifth, sixth, seventh and eighth current source means responsive to the second drive control signal such that said sixth and eighth current source means are nonconducting and said fifth and seventh current source means are conducting when the baseline signal level of the second three-level signal is required.

21. A system for receiving a serial binary data signal at a first data rate and a clock signal associated with the data signal and transmitting the data of the data signal over first and second pairs of conductors in a transmission medium, said system comprising:

demultiplexing means, including inputs for receiving the serial binary data signal and the associated clock signal, for providing first and second serial binary data signals each at a second data rate that is approximately one-half the first data rate and for providing first and second clock signals respectively associated with the first and second data signals;

encoder means, including inputs for receiving the first and second data signals and first and second clock signals, for encoding the first and second data signals and for providing drive control signals corresponding to the encoded first and second data signals; and line driver means, having an input for receiving the drive control signals and first and second outputs for coupling to the first and second conductor pairs, for respectively driving the first and second conductor pairs with first and second multi-level encoded signals in accordance with the drive control signals.

22. The line driving system of claim 21 further including first and second transformers having primary windings respectively coupled to the first and second outputs of said line driving means; and said first and second transformers having secondary windings respectively for coupling to the first and second conductor pairs.

23. The line driving system of claim 22 wherein each of said first and second multi-level encoded signals consists of a positive differential, a baseline and a negative differential signal level, the primary winding of each transformer having first and second terminals, said drive control signals comprising first and second drive control signals;

said line driving means including two substantially identical line driver circuits respectively coupled to receive the first and second drive control signals, each said line driver circuit including a DC voltage source, a reference voltage bus, a first electrical load coupled between said voltage source and said reference voltage bus, a second electrical load coupled between said voltage source and said reference voltage bus, said first and second loads being equal in magnitude, first current source means, coupled between said first load and the reference voltage bus and responsive to the drive control signal, for conducting a first current magnitude, a second current magnitude that is twice the first current magnitude or no current, second current source means, coupled between said second load and the reference voltage bus and responsive to the drive control signal, for conducting the first current magnitude, the second current magnitude or no current, a first output terminal, between said second load and said second current source means, for coupling to the first terminal of the transformer primary winding, a second output terminal, between said first load and said first current source means, for coupling to the second terminal of the transformer primary winding, said first and second current source means being responsive to the drive control signal such that said first current source means conducts no current and said second current source means conducts the second current magnitude when the negative differential signal level of the three-level signal is required, said first and second current source means being responsive to the drive control signal such that said first current source means conducts the second current magnitude and said second current source means conducts no current when the positive differential signal level of the three-level signal is required, and said first and second current source means being responsive to the drive control signal such that each of said first and second current source means conducts the first current magnitude when the baseline level of the three-level signal is required.

24. A line driver circuit for providing a balanced N-signal-level line driving signal in a system for driving a transmission medium through a drive transformer, where N is an odd integer, one of the signal levels is a baseline level and the remaining signal levels are uniformly distributed above and below the baseline level, the drive transformer having a primary winding and a secondary winding, the primary winding having first and second terminals for coupling to said line driver circuit, the secondary winding for coupling to a pair of conductors in the transmission medium, said line driver circuit responsive to an externally generated drive control signal that determines a required level of the N-level signal, said line driver circuit comprising:

a DC voltage source;

a reference voltage bus;

a first electrical load coupled between said voltage source and said reference voltage bus;

a second electrical load coupled between said voltage source and said reference voltage bus, said first and second loads being equal in magnitude;

first current source means, coupled between said first load and the reference voltage bus and responsive to the drive control signal, for either conducting a selected one of a predetermined number of current magnitudes or conducting no current;

second current source means, coupled between said second load and the reference voltage bus and responsive to the drive control signal, for either conducting a selected one of the predetermined number of current magnitudes or conducting no current;

a first output terminal, between said second load and said second current source means, for coupling to the first terminal of the transformer primary winding;

a second output terminal, between said first load and said first current source means, for coupling to the second terminal of the transformer primary winding;

said first and second current source means responsive to the drive control signal such that said first current source means conducts no current and said second current source means conducts a selected one of the current magnitudes when one of the signal levels below the baseline level of the N-level is required;

said first and second current source means responsive to the drive control signal such that said first current source means conducts a selected one of the current magnitudes and said second current source means conducts no current when one of the signals above the baseline level of the N-level signal is required; and said first and second current source means responsive to the drive control signal such that each of said first and second current source means conducts an identical one of the current magnitudes when the baseline level of the N-level signal is required.

25. The line driver circuit of claim 24 wherein each of said first and second loads is a resistance; and the sum of the resistances of said first and second loads is substantially equal to a resistive portion of the characteristic impedance of the conductor pair.

26. The line driver circuit of claim 24 further including control means, coupled to receive said drive control signal, for providing switching control signals to said first and second current source means to control the conducting state of each of said first and second current source means.

27. A method for providing a balanced three-level line driving signal from a line driver circuit for driving a transmission medium, the three-level signal consisting of a positive differential, a baseline and a negative differential signal level, the line driver circuit driving the transmission medium through a drive transformer having a primary winding and a secondary winding, the primary winding having first and second terminals for coupling to the line driver circuit, the secondary winding for coupling to a pair of conductors in the transmission medium, the line driver circuit including a DC voltage source, a reference voltage bus, a first electrical load coupled between the voltage source and the reference voltage bus, a second electrical load coupled between the voltage source and the reference voltage bus, the first and second loads being equal in magnitude, a first current source between the first load and the reference voltage bus, and a second current source between the second load and the reference voltage bus, the method comprising the steps of:

conducting a first current magnitude through each of the first and second current sources when the baseline level of the three-level signal is required;

conducting no current through the first current source and conducting a second current magnitude through the second current source when the negative differential signal level of the three-level signal is required; and conducting the second current magnitude through the first current source and conducting no current through the second current source when the positive differential signal level of the three-level signal is required.

28. The method of claim 27 including the further step of:

generating a line drive control signal that determines a required signal level of the three-level signal; and controlling the respective conductivities of the first and second current sources in accordance with the line drive control signal.

* * * * *